United States Patent
Ocera

(10) Patent No.: US 7,883,332 B2
(45) Date of Patent: Feb. 8, 2011

(54) METHOD AND APPARATUS FOR PRODUCING A SEAL INCLUDING A PORTION HAVING A WALL OF VARIABLE THICKNESS

(75) Inventor: Rosario Ocera, Rivoli (IT)

(73) Assignee: Metzeler Automotive Profile Systems Italy S.p.A., Cirie (Torino) (IT)

( * ) Notice: Subject to any disclaimer, the term of this patent is extended or adjusted under 35 U.S.C. 154(b) by 261 days.

(21) Appl. No.: 11/721,618

(22) PCT Filed: Sep. 10, 2004

(86) PCT No.: PCT/EP2005/054403

§ 371 (c)(1),
(2), (4) Date: Jun. 13, 2007

(87) PCT Pub. No.: WO2006/027364

PCT Pub. Date: Mar. 16, 2004

(65) Prior Publication Data

US 2008/0217805 A1    Sep. 11, 2008

(30) Foreign Application Priority Data

Sep. 10, 2004   (IT) .......................... TO2004A0609

(51) Int. Cl.
*B28B 21/52* (2006.01)
*B29C 47/22* (2006.01)

(52) U.S. Cl. .................. 425/465; 264/564; 264/167; 264/177.17; 264/209.8; 264/210.2; 425/464; 425/466

(58) Field of Classification Search ............ 264/500, 264/512, 514, 515, 564, 165, 167, 176.1, 264/177.1, 177.14, 209.1, 209.8, 210.1, 210.4, 264/280, 177.17, 210.2; 425/461, 464, 465, 425/466
See application file for complete search history.

(56) References Cited

U.S. PATENT DOCUMENTS

| 4,960,375 A | 10/1990 | Saito et al. |
| 5,162,090 A | 11/1992 | Arima et al. |
| 5,486,325 A | 1/1996 | Arima et al. |
| 5,551,855 A | 9/1996 | Yada et al. |
| 5,792,405 A | 8/1998 | Tsuchida et al. |

FOREIGN PATENT DOCUMENTS

EP        0115 750 B1    3/1987

*Primary Examiner*—Joseph S Del Sole
*Assistant Examiner*—Ryan Ochylski
(74) *Attorney, Agent, or Firm*—Sughrue Mion, PLLC

(57) ABSTRACT

The method makes it possible to produce a seal (1) of an extruded plastics material, including a tubular section (3) with a wall of variable thickness (WT), using a distribution chamber having a terminal die plate (12) with an annular extrusion orifice (15) formed therein, corresponding to the cross section of the tubular section (3). A chamber (18) is formed in the distribution chamber in communication with the extrusion orifice (13) and into which an elastomeric material is fed for forming the tubular section (3). The chamber (18) of the distribution chamber is in open communication with the outside environment by a passage (21) which is separate from the extrusion orifice (13) and is provided to carry a flow of elastomeric material coming from the chamber (18). During extrusion, the output cross section of the elastomeric material through the passage (21) is varied so as to cause corresponding variations in the pressure of the elastomeric material in the chamber (18) and corresponding variations in the thickness of the wall (WT) of the tubular section (3) extrud through the extrusion orifice (13).

6 Claims, 4 Drawing Sheets

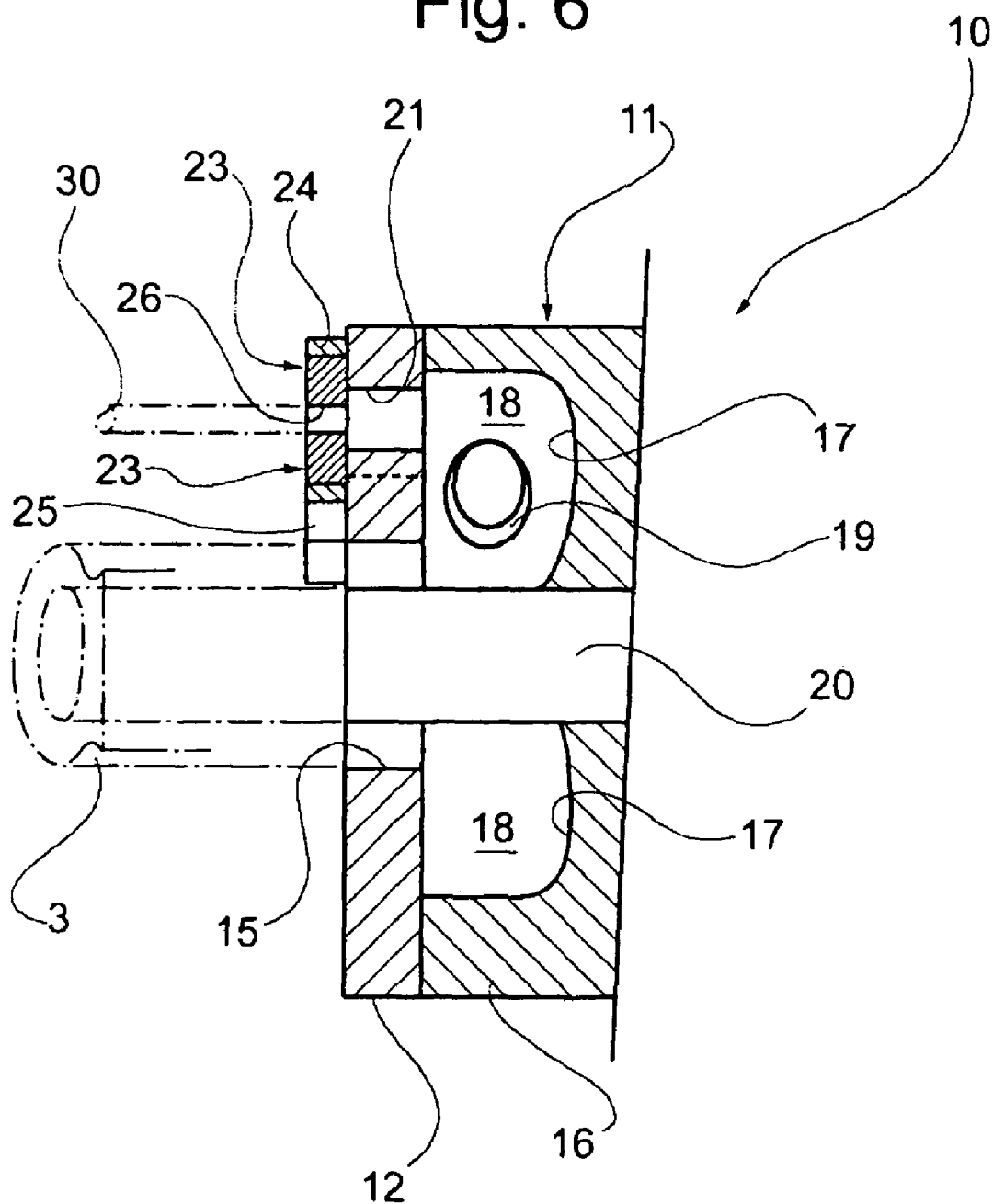

METHOD AND APPARATUS FOR PRODUCING A SEAL INCLUDING A PORTION HAVING A WALL OF VARIABLE THICKNESS

BACKGROUND OF INVENTION

The present invention relates to a method according to the preamble of claim 1 and an apparatus according to the preamble of claim 5 for producing a seal including a tubular section of an elastomeric material with a wall of variable thickness.

U.S. Pat. No. 5,162,090A discloses a method and an apparatus of this type wherein an obturator is displaceable on the terminal die plate, between a passive position in which it does not interfere with the tubular extrudate exiting from the die and closes an escape passage in the die, and an active position in which it engages and deforms the extrudate on one side causing a modification of the cross-section thereof from an O-shape to a D-shape. In the active position the obturator opens the escape passage of the die and the elastomeric material which flows therethrough allows to compensate the increase of the back pressure in the extruder which is due to the overall reduction of the cross-sectional area of the tubular extrudate.

One object of the present invention is to provide improved method and apparatus of the initially defined kind.

SUMMARY OF THE INVENTION

The above objects of the invention are achieved by means of extrusion apparatus described below.

BRIEF DESCRIPTION OF THE DRAWINGS

Further characteristics and advantages of the invention will become apparent from the detailed description which follows, provided purely by means of non-limitative example, with reference to the appended drawings, in which:

FIG. 6 is a sectioned view similar to that of FIG. 5, showing a movable obturator device in a different operating condition.

DETAILED DESCRIPTION OF THE INVENTION

Figure 1:
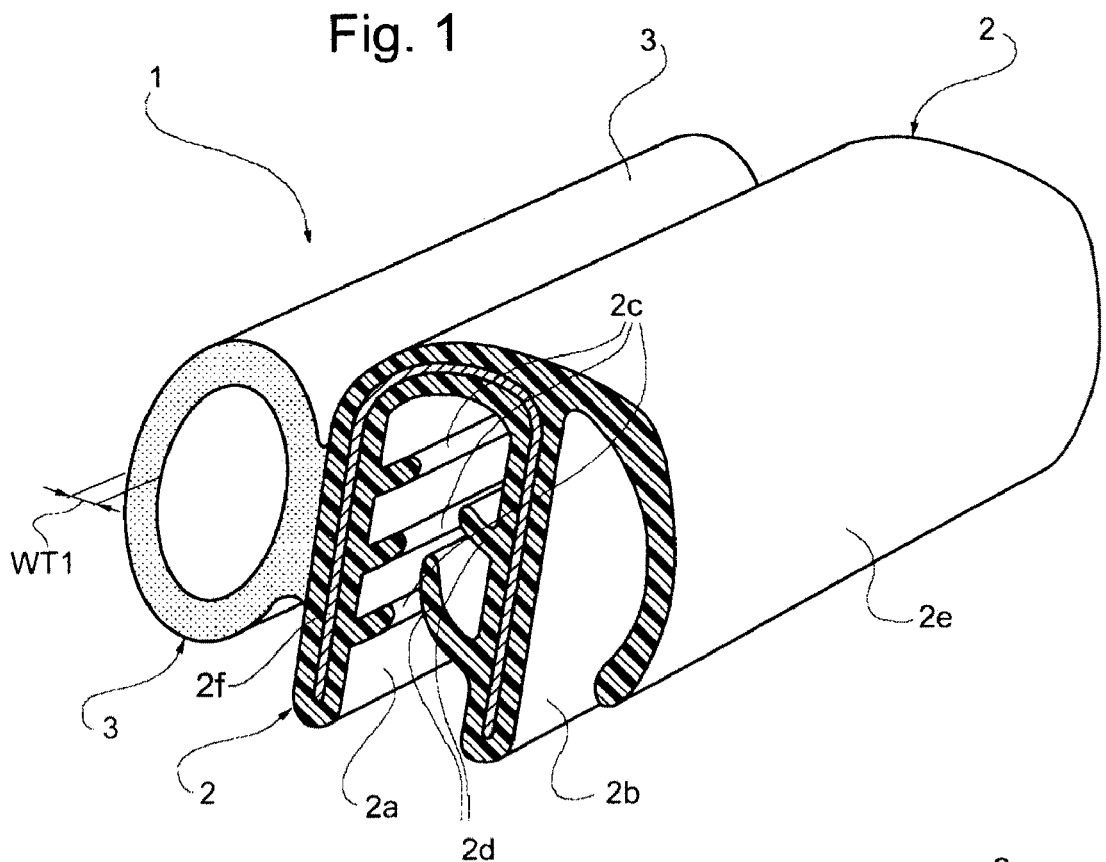
FIG. 1 is a perspective view of a portion of a seal including a tubular section with a wall of a first thickness.
Figure 2:
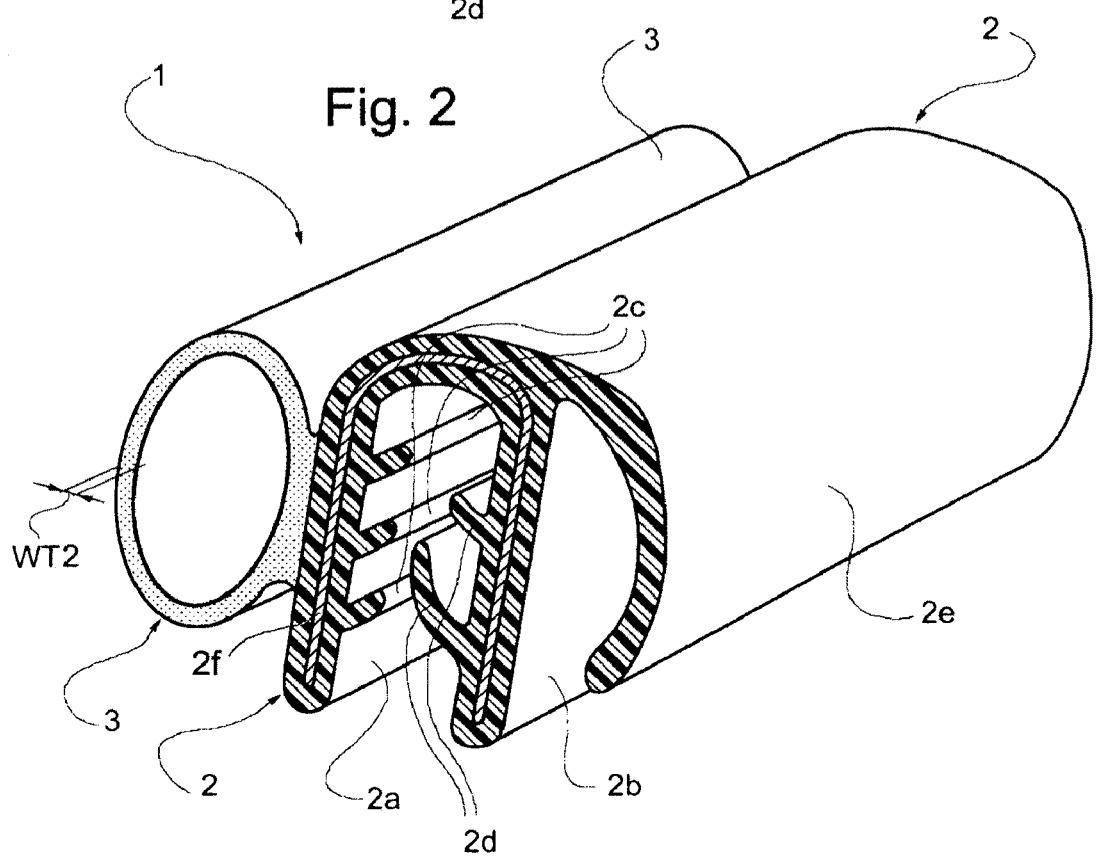
FIG. 2 is a perspective view similar to that of FIG. 1, showing a portion of the same seal, in which the wall of the tubular section is of a lesser thickness.

In FIGS. 1 and 2 a seal, generally indicated 1, is intended to be applied to the edge of an aperture, associated with a door or hatch, in the body of a motor vehicle.

In a manner known in the art, the seal 1 includes a fixing section 2, essentially in the form of an inverted U and made of solid rubber. This fixing section has two end arms 2a and 2b, with lip formations 2c and 2d respectively extending therefrom for improving their grip on a flange or edge around an aperture in the body of a motor vehicle.

In the embodiment illustrated by way of example, the fixing section 2 also has an outer lip formation 2e extending essentially from the base of the arm 2b.

It is convenient if a metal reinforcement element 2f is embedded in the fixing section 2 during extrusion.

A tubular sealing section, generally indicated 3, extends from the outer wall of the arm 2a of the fixing section 2, formed of an expanded elastomeric material, also known as foam rubber.

In the portion of the seal 1 shown in FIG. 1, the wall of the tubular section 3 is of increased thickness and indicated WT1. In the portion of seal 1 shown in FIG. 2, on the other hand, the wall of the tubular seal section 3 is of a reduced thickness indicated WT2 (<WT1).

When considering a seal intended to be applied to the edge of an aperture in the body of a motor vehicle, it is opportune if in the portions of the seal which are to be fitted to corner areas or to other reduced radius areas of the aperture, the thickness of the tubular sealing section 3 is increased, in order to limit the formation of creases and/or to make the section stronger in localized areas, even along straight portions.

It is also desirable that variations in the thickness of the wall of the tubular section 3 are achieved continuously during extrusion, without leaving visible "evidence" or other undesirable deformations.

FIGS. 3 to 6 show extrusion apparatus according to the invention, operable to obtain the aforementioned results.

Figure 3:
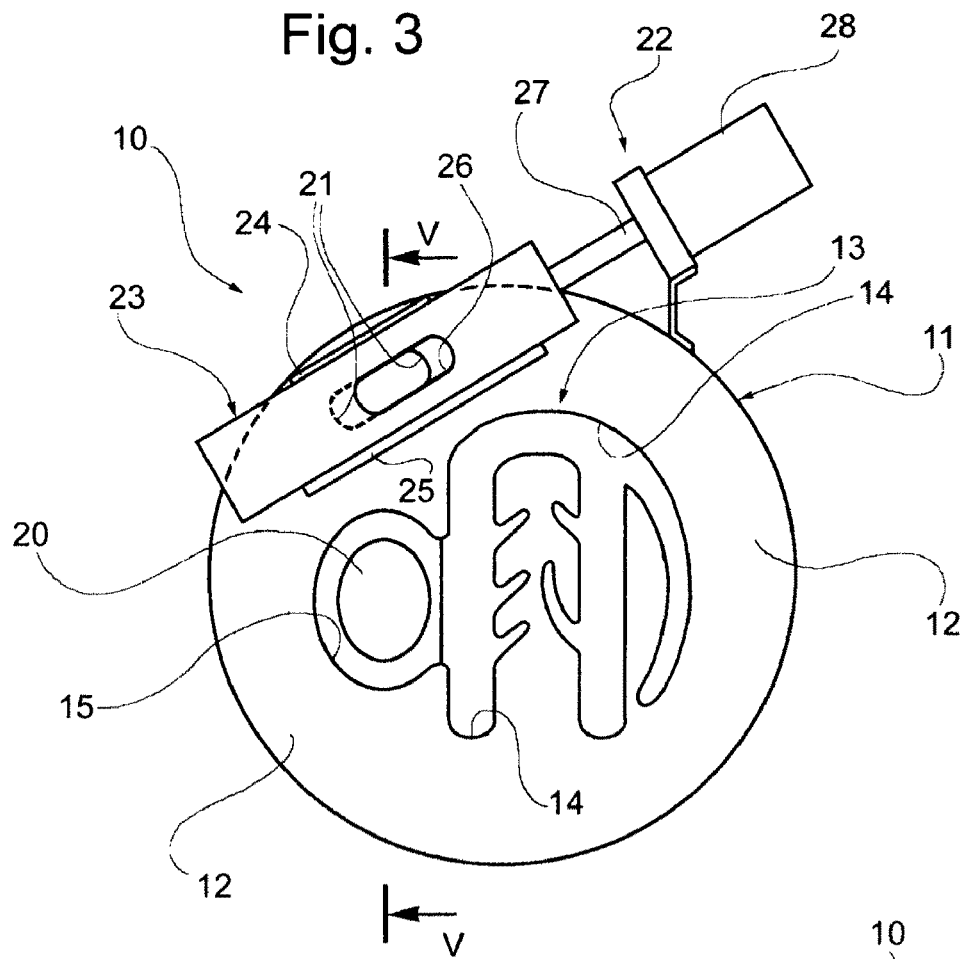
FIG. 3 is a front view of extrusion apparatus according to the present invention.

In FIGS. 3 to 6, extrusion apparatus according to the present invention is generally indicated 10. This apparatus includes a distribution block 11 with a terminal die plate 12 (see FIGS. 3, 5 and 6) substantially in the shape of a disc. An extrusion orifice generally indicated 13 in FIG. 3 is formed in the terminal die plate 12, with a cross section corresponding to that of the tubular sealing section 3 of the seal 1.

In particular, the extrusion orifice includes a first orifice portion 14, the cross section of which substantially corresponds to that of the fixing section 2 of the seal 1, and a second, annular orifice portion 15 corresponding in shape to that of the tubular sealing portion 3 of the seal 1.

Figure 4:
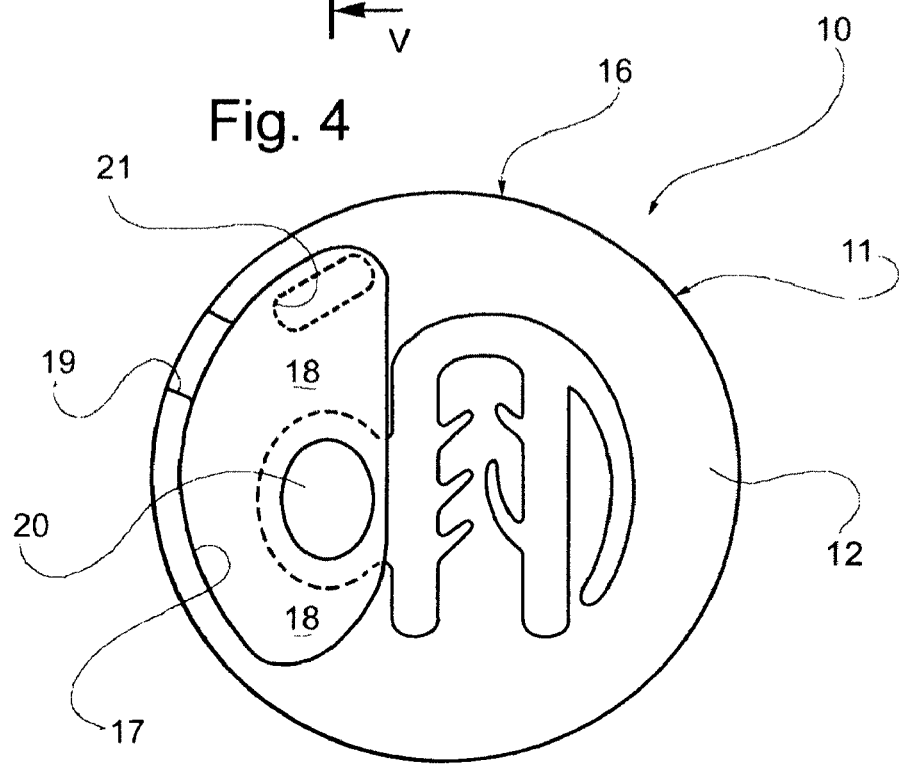
FIG. 4 is a front view of the conveyor of the extrusion apparatus of FIG. 3.
Figure 5:
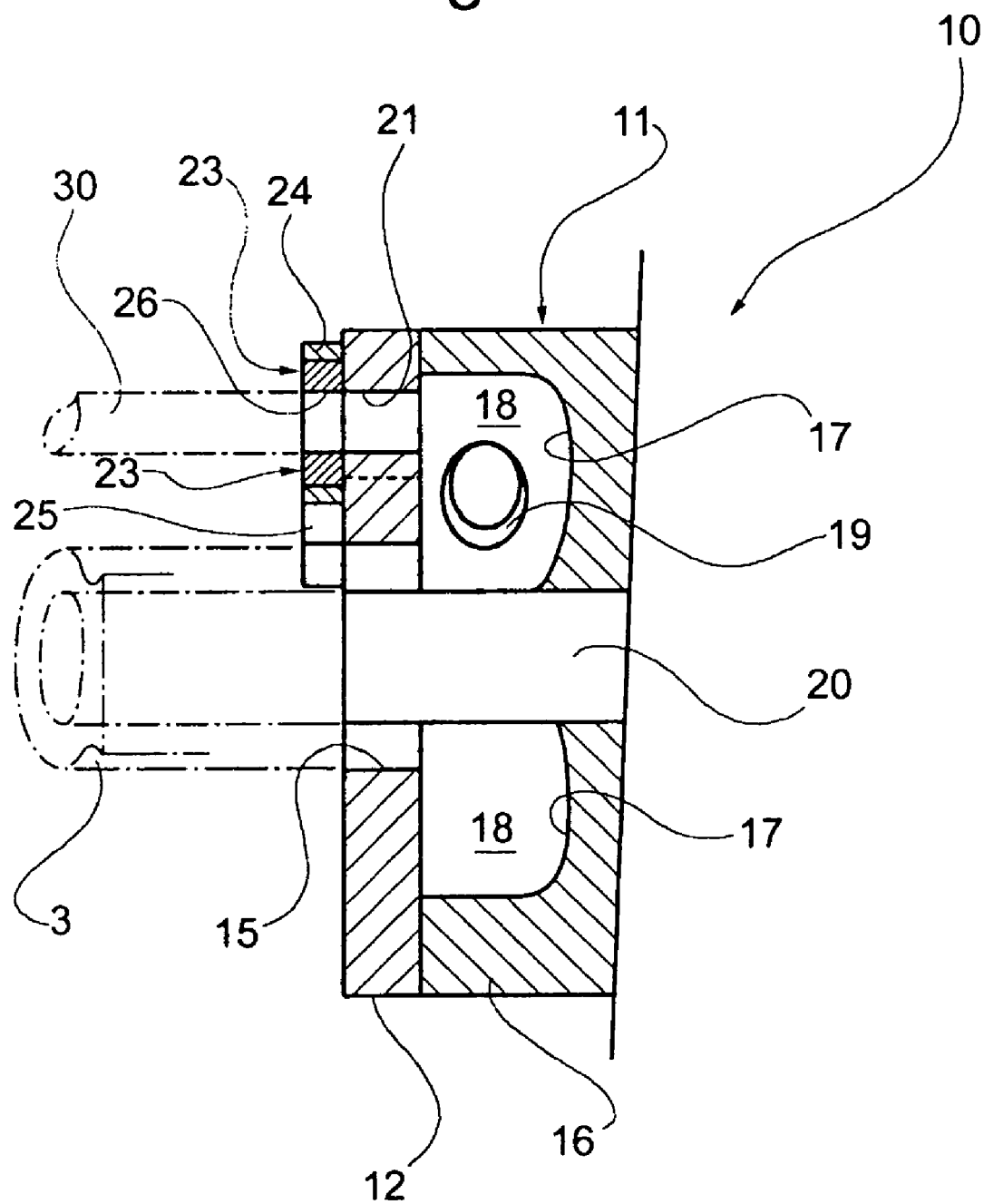
FIG. 5 is a section taken on the line V-V of FIG. 3.

Behind the terminal die plate 12, the distribution block includes a body indicated 16 in FIGS. 4 to 6 and having a cavity 17 in the side facing the die plate 12. Together with the rear surface of the die plate 12, this cavity 17 defines a chamber 18 in communication with the extrusion orifice portion 15 and operable to form the tubular sealing section 3.

As can be seen in FIGS. 4 to 6, the chamber 18 has a lateral aperture 19 through which a flow of elastomeric material is fed in operation for forming the tubular sealing section 3.

In FIGS. 3 to 6, a cylindrical core or male element, indicated 20, extends essentially parallel to the longitudinal axis of the distribution block 11, passing through the chamber 18 and the terminal die plate 12, spaced from the edge of the portion 15 of the extrusion orifice. The cross section of the core 20 substantially corresponds to the cross section of the inside of the tubular sealing section 3 of the seal.

A passage is formed in the apparatus 10 of the invention, separate and distinct from the extrusion orifice 13 and, in particular, separate and distinct from the portion 15 of this orifice, for selectively putting the chamber 18 of the distribution block 11 into communication with the outside environment.

In the embodiment shown by way of example in the drawings, this passage, indicated 21, is formed through the terminal die plate 12 and is elongate in cross section, rather in the shape of a buttonhole.

In operation, the passage 21 acts to convey a flow of elastomeric material under pressure to the chamber 18 of the distribution block 11.

The extrusion apparatus also includes an adjustment device, generally indicated 22 in FIG. 3. This device is provided for varying the output cross section of the elastomeric material flowing through the passage 21 during extrusion.

In the embodiment shown by way of example, the adjustment device 22 includes a movable obturator 23, mounted for translation between two linear guides 24 and 25 on the external surface of the terminal die plate 12 (see also FIGS. 5 and 6).

The obturator 23 has an elongate aperture 26, configured like the aperture 21 in the die plate 12.

The obturator 23 is coupled by means of a terminal stem 27 (see FIG. 3) to a stationary actuator device 28 operable to control its position relative to the die plate 12.

In dependence on the position of the obturator 23, the net cross section of the passage through the aperture 26 of the obturator and the aperture 21 in the die plate 12 varies the outflow section of the elastomeric material which in operation flows from the chamber 18 into the passage 21.

FIG. 5 shows the obturator 23 in a position where the intersection of the apertures 26 and 21 is at its maximum whereby, in operation, a waste element of elastomeric material 30 with a relatively large cross section is produced.

FIG. 6 shows the obturator 23 in a different position, in which the intersection between the apertures 26 and 21 is smaller whereby, in operation, a waste element 30 of elastomeric material a relatively small cross section is produced.

In operation, an elastomeric material is fed in a manner which is known per se to the distribution block 11 and caused to flow through the portion 14 of the extrusion orifice 13 (see FIG. 3), so as to form the fixing section 2 of the seal 1. Simultaneously, a flow of relatively softer elastomeric material, of so-called foam rubber for example, is fed under pressure to the chamber 18 of the distribution block 11, flowing out of the extruder through the portion 15 of the extrusion orifice 13 to form the tubular sealing section 3 and out through intersection of the apertures 21 and 26 described above to form a waste element 30.

When the movable obturator 23 is in a position whereby the intersection between the apertures 26 and 21 is at a minimum, the elastomeric material in the chamber 18 reaches a maximum value of pressure causing, as shown by way of indication in FIG. 6, an increase in the output of material through the portion 15 of the extrusion orifice, whereby the tubular sealing section 3 is manufactured with a wall of increased thickness.

Conversely, when the intersection between the apertures 21 and 26 is at its maximum, the pressure of the elastomeric material in the chamber 18 is relatively low and a tubular sealing section will be extruded through the portion 15 of the orifice 13 with a relatively thin wall, as shown by way of indication in FIG. 5.

The extrusion apparatus 10 described above therefore makes it possible to vary the thickness of the wall of the tubular sealing section 3 of the seal 1 continuously, during the extrusion process, without leaving any traces or "evidence" of this varying cross section. Furthermore, the variation in cross section, that is of the thickness of the wall of the tubular sealing section 3 can be substantially constant or can vary along certain portions of edge of the tubular section if the chamber 18 is suitably shaped.

It is convenient if operation of the actuator 28 can be controlled by an electronic control unit, in synchronism with the speed of advancement of the extruded seal, as measured by a method known per se, so as to achieve the required variations in cross section along the desired longitudinal portions of the seal.

It is preferable to adopt an arrangement whereby the minimum outflow section of the elastomeric material through the passage 21 is greater than zero, thereby ensuring that the waste product 30 is formed in a continuous element.

Naturally, the principle of the invention remaining unchanged, embodiments and manufacturing details may vary widely from those described and illustrated here, without departing thereby from the scope of the invention, as claimed in the appended claims.

The invention claimed is;

1. An apparatus (10) for producing a seal (1) including a tubular sealing section (3) of an extruded elastomeric material,
   including a distribution block (11) having a terminal die plate (12) with an annular extrusion orifice (15) formed therein, corresponding to the cross section of the said tubular section (3); a chamber (18) being defined in the distribution block (11), in communication with the said orifice (15) and through which an elastomeric material for forming the said tubular section (3) is fed during operation;
   a passage (21) being formed through the die plate (12), separate and distinct from the said extrusion orifice (15) and able to put the said chamber (18) into communication with the external environment, the said passage (21) being provided to carry a flow of waste elastomeric material;
   a movable obturator (23) being associated with the said passage (21) for controlling the flow of the waste elastomeric material therethrough during extrusion;
   wherein said obturator (23) is movable without any interference or contact with the tubular section (3) of the seal (1) being extruded and is predisposed to only vary the output cross-section of said passage (21) for the elastomeric material, whereby in use variations in the wall thickness (WT) of said tubular section (3) are solely determined by variations in the pressure of the elastomeric material in the said chamber (18) achieved through the movement of said obturator (23).

2. An apparatus according to claim 1, wherein said movable obturator (23) is able to vary the outflow section of the said passage (21) between a maximum value and a minimum value greater than zero, in such a way that through said passage (21) a continuous waste material (30) is extruded during operation.

3. An apparatus according to claim 1, in which the said passage (21) extends through the aforesaid terminal die plate (12).

4. An apparatus according to claim 1, wherein said obturator (23) is movable relative to the die plate (12) and cooperates with the said passage (21).

5. An apparatus according to claim 1, wherein said obturator is linearly movable.

6. An apparatus for producing a seal including a tubular sealing section of an extruded elastomeric material, comprising:
   distribution block means having a terminal die plate with an annular extrusion orifice formed therein, corresponding to the cross section of the said tubular section, a chamber being defined in the distribution block, in communication with the said orifice and through which an elastomeric material for forming the said tubular section is fed during operation;
   passage means formed through the die plate independent from the said extrusion orifice and for communicating said chamber the external environment, the said passage means being provided to carry a flow of waste elastomeric material;

flow control means, associated with the said passage means, for controlling the flow of the waste elastomeric material therethrough during extrusion;

wherein said flow control means is operable without any interference or contact with the tubular section of the seal being extruded and varies the output flow through said passage means for the elastomeric material, whereby in use variations in the wall thickness of said tubular section are solely determined by variations in the pressure of the elastomeric material in the said chamber achieved through the operation of the flow control means.

* * * * *